United States Patent [19]

Tsunekawa et al.

[11] Patent Number: 4,725,866
[45] Date of Patent: Feb. 16, 1988

[54] LIGHT MEASURING APPARATUS

[75] Inventors: Tokuichi Tsunekawa, Yokohama; Hajime Kanazawa, Tokyo; Hiroshi Ohmura, Wako, all of Japan

[73] Assignee: Canon Kabushiki Kaisha, Tokyo, Japan

[21] Appl. No.: 912,334

[22] Filed: Sep. 26, 1986

[30] Foreign Application Priority Data

Sep. 30, 1985 [JP]  Japan .............................. 60-216338
Sep. 30, 1985 [JP]  Japan .............................. 60-216339

[51] Int. Cl.⁴ .......................... G03B 7/091; G01J 1/42
[52] U.S. Cl. ..................................... 354/410; 354/432; 356/215; 356/222
[58] Field of Search ......... 354/410, 429–434; 356/218, 222, 226, 215; 358/214–216; 307/311, 353; 250/206, 209, 214 R, 214 L, 214 P, 214 C

[56] References Cited

U.S. PATENT DOCUMENTS 4,055,752 10/1977 Kappe et al. .................... 356/215
4,203,668  5/1980 Chapman ........................ 356/215
4,465,369  8/1984 Saegusa et al. ................ 354/432 X
4,652,929  3/1987 Stemme et al. ................... 358/214

Primary Examiner—W. B. Perkey
Attorney, Agent, or Firm—Robin, Blecker & Daley

[57] ABSTRACT

The present invention is characterized by repeatedly AD converting in a time series an output of each light sensitive element, and at the same time an added value or a mean value of each one of said AD converted values is obtained so that such added value or a mean value is used as an output of each light sensitive element. According to the present invention, an influence of flickering of an artificial light source can be eliminated and at the same time a light measuring computation with a high level of accuracy can be made with a higher speed than that in a conventional method, and particularly in a light measuring apparatus housing a number of light sensitive elements a light measuring computation with a high level of accuracy can be made in a by far faster speed than that in a conventional method.

10 Claims, 10 Drawing Figures

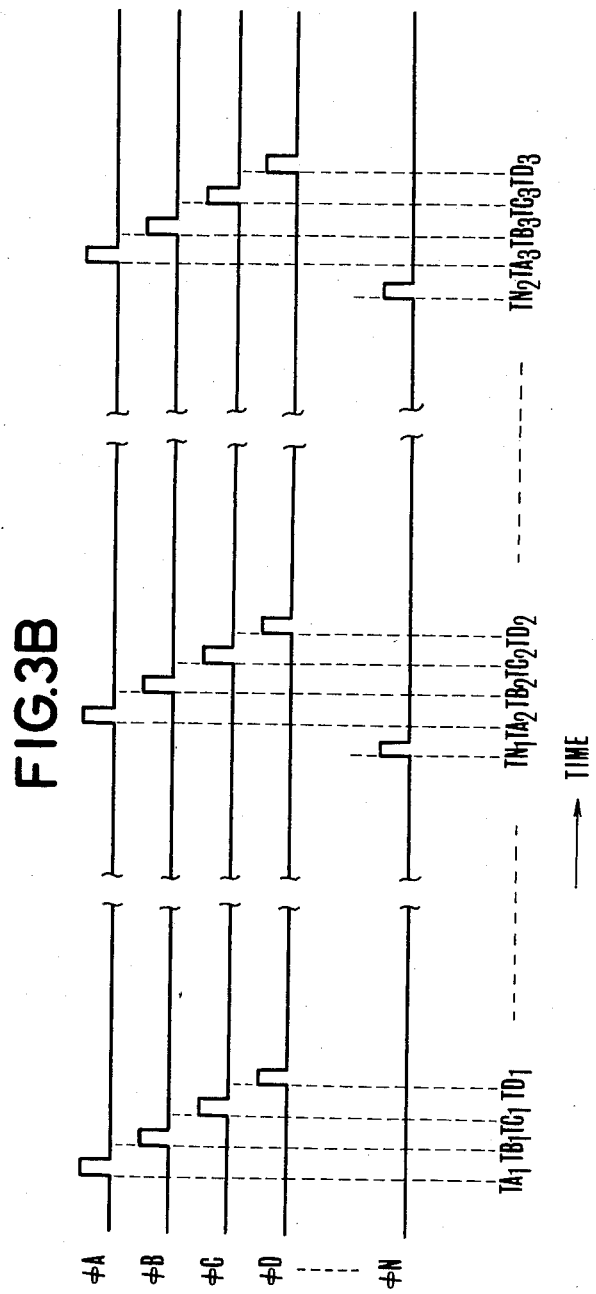

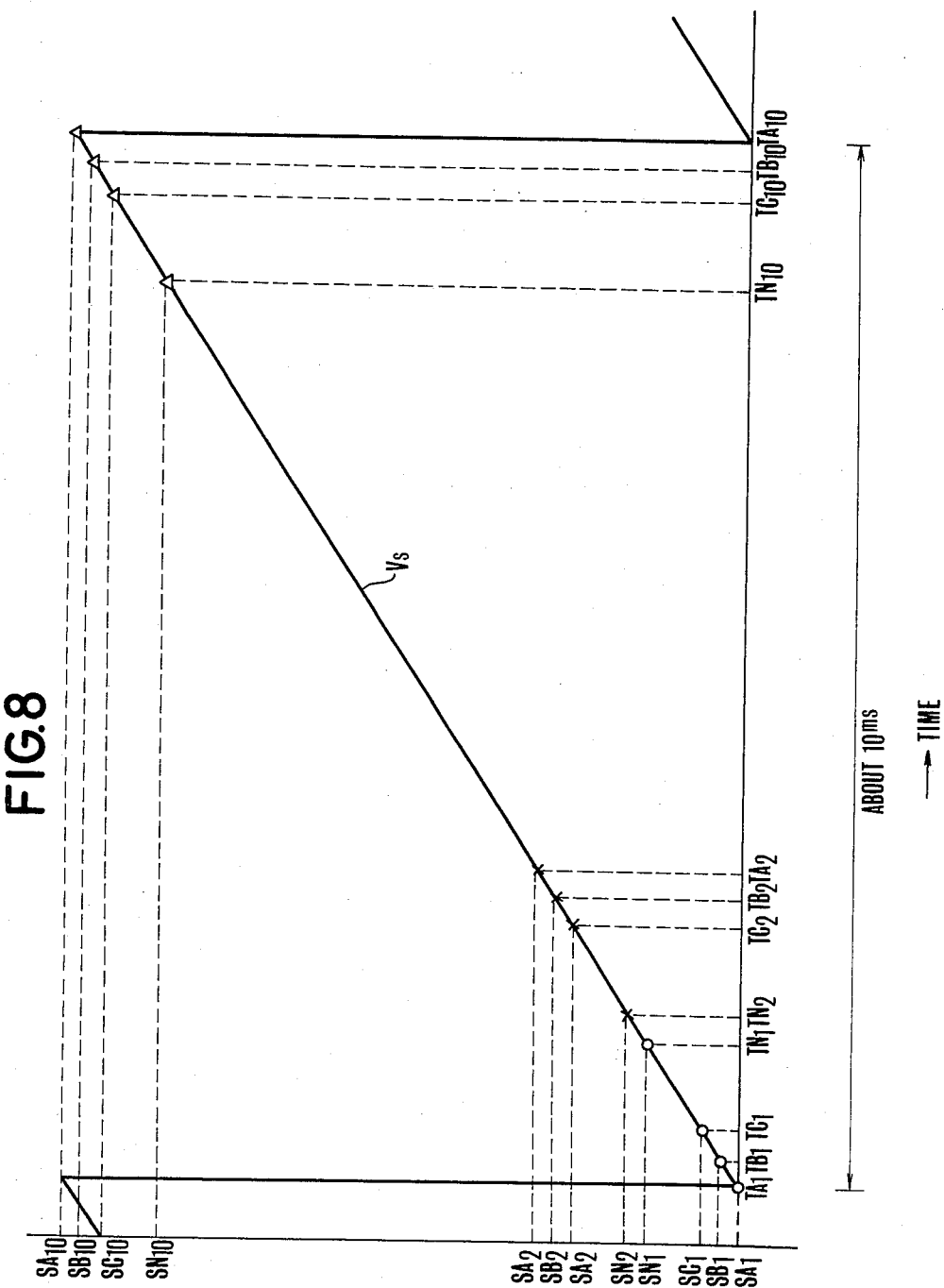

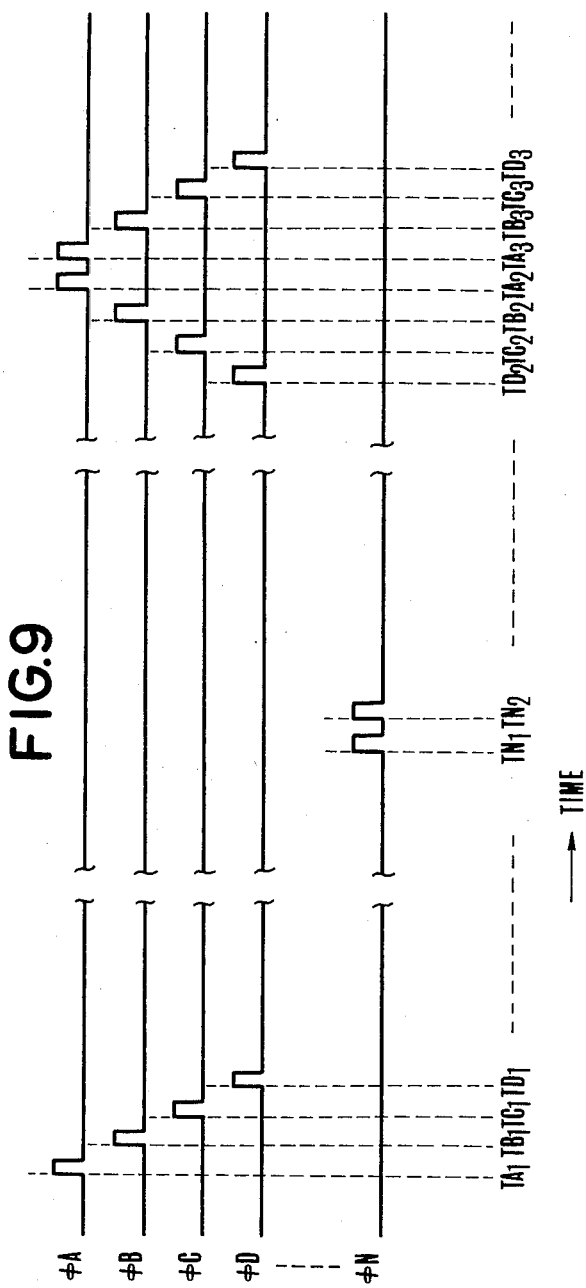

LIGHT MEASURING APPARATUS

BACKGROUND OF THE INVENTION

1. Field of the Invention

The present invention relates to a light measuring method and a light measuring apparatus for automatically measuring the brightness of an object and a place (scene), etc., and particularly to a light measuring method and a light measuring apparatus used in an automatic exposure control apparatus of a camera.

2. Description of the Related Art

Most of cameras recently produced are equipped with an electronic shutter (automatic exposure control apparatus), therefore a measuring of brightness of an object and a background as well as a determination of an exposure are done in a totally automatic manner. An electronic shutter consists of, as known well, light measuring elements for producing such electric outputs as corresponding to the brightness of an object and a background and a signal processing circuit for processing output signals of the light measuring elements, and many of such electronic shutters have all of their signal processing circuits made of analog circuits, but in the case of an SLR camera (a single lens reflex camera), it employs a TTL light measuring system and needs a long time memorizing of the light measuring information, thus circuit portions relating to a computation processing and a memorizing of an electronic shutter for an SLR camera are digitalized except the circuitry for compressing the output signals of the light measuring elements. However, although the processing of light measuring signals with a digital circuit allows a computation with a high level of accuracy and at the same time it is advantageous for memorizing the light measuring information, when a light measuring is done under an illumination by an artificial light source, some countermeasure needs to be taken to prevent an influence of flicker of such light source from affecting the light measuring.

FIG. 4 shows an arrangement of important parts of a light measuring apparatus in a conventional electronic shutter for an SLR camera. In this diagram, SPA is a light measuring element positioned at the center of a photo-taking image plane, and SPB is a light measuring element for measuring light at a periphery of a phototaking image plane, while OP is an operational amplifier to amplify output signals of these light measuring elements SPA and SPB, then LD is a logarithmic compression element for logarithmically compressing the output signals of the light measuring elements, and AD1 is an AD converter of a double integration type for converting the output of the operational amplifier to digital signals, then CKT is an operational circuit. At the input terminals of the operational amplifier, analog switches FGA and FGB, which are connected in series respectively to the light measuring elements SPA and SPB and are made of MOSFETs, are connected, and are so arranged that the switch FGA only is turned on by a control signal impressed onto a gate $\phi A$ when a spot light measuring is done, and both of the switches FGA and FGB are turned on by control signals impressed onto gates $\phi A$ and $\phi B$ when an averaging light measuring is made. Also, analog gates EGA and EGB are provided in parallel to the light measuring elements SPA and SPB, and these analog gates EGA and EGB are so made as being turned on and off in a mutually compensating manner with the analog switches FGA and FGB which are connected in series to them respectively. That is, when a control signal is impressed onto the gate $\phi A$ and the analog switch FGA is turned on, a control signal which makes the analog gate EGA nonconductive is impressed onto the gate $\phi A$, then the analog gate EGA is turned off. These analog gates EGA and EGB are to release the voltages generated at the light measuring elements SPA and SPB when the analog switches FGA and FGB are turned off, for short-circuiting the light measuring elements. While the AD converter AD1 has a function of converting the output signal of the operational amplifier OP to a digital signal, it needs to have a function of completely eliminating an influence of flicker of an artificial light source in a light measuring under such light source.

FIG. 5 is a diagram to show the principle of an AD conversion in the AD converter AD1 of a double integration type used in a conventional light measuring apparatus. In this diagram, $V_A$ and $V_B$ are signals obtained by logarithmically compressing and amplifying the output signals of the light measuring elements SPA and SPB, while $V_A'$ and $V_B'$ show signals by a discharge from an integration capacitor housed within the AD converter AD1. Also, $T_1$ is an integration time and $T_2$ and $T_3$ show an inverse integration time, wherein the integration time T·is set at 10 m.sec. which is equivalent to one cycle of flicker of such artificial illumination light source as a fluorescent lamp (provided that a driving power source for that light source is assumed as commercial alternating current of 50 Hz or 60 Hz). In this diagram, when an AD conversion of the input signal $V_A$ is started at the time $t_1$, the output $V_A$ of the light measuring element SPA is integrated for a period of time of $T_1$ until the time $t_2$ then a discharging will be made from the integration capacitor housed within the AD converter AD1 during a period of time of $T_2$ that is from the time $t_2$ to the time $t_3$. The output $V_B$ of the light measuring element SPB has also, after being integrated during the period of time of $T_1$, a voltage drop $V_B'$ by the inverse integration through the discharge from the integration capacitor after the time $t_2$ continued till the time $t_4$ by the inverse integration. Digital signal outputs corresponding to the input analog signals $V_A$ and $V_B$ become such pulse train as equivalent to the lengths of the periods of time $T_2$ and $T_3$ and are impressed onto the operating circuit CKT.

An AD converter of a double integration type as mentioned above has a drawback that when a number of light measuring elements is n, a period of time, $(10 \times n)$ m.sec. will be needed for digitally converting the output of each light measuring element as the minimum time of 10 m.sec. is needed for that digital conversion, thus a length of time required for light measuring is too long. Therefore, a camera housing an electronic shutter of such light measuring system as mentioned above cannot photograph an object moving at a high speed.

SUMMARY OF THE INVENTION

An object of the present invention is to provide a light measuring apparatus which can make a light measuring at many measuring portions and has flicker elements almost evenly superimposed over the light measuring output at each measuring portion, so that resultantly light measuring data which are not influenced by flicker elements can be obtained.

Another object of the present invention is to provide a light measuring apparatus which can AD (analog-digital) convert output signals of a number of light measuring elements and as a result can process a number of light measuring signals within a shorter period of time than that in a conventional light measuring system.

Further objects of the present invention shall be made clear from detailed explanations of the present invention to be given below.

The present invention is characterized by that an output of each light measuring element is repeatedly AD converted in a time series and at the same time an added value or a mean value of such AD converted values is obtained and such added value or mean value is used as the output of each light measuring element, for eliminating the drawbacks mentioned above.

BRIEF DESCRIPTION OF THE DRAWINGS

FIG. 3B is a waveform diagram of an output of a control circuit CONT of the apparatus shown in FIGS. 1 and 2.

FIG. 8 is a diagram schematically depicting a flicker waveform for explaining the operations in the present invention.

FIG. 9 is an output waveform diagram of a control circuit CNTA in the apparatus shown in FIGS. 6 and 7.

DETAILED DESCRIPTION OF THE PREFERRED EMBODIMENTS

Figure 1:
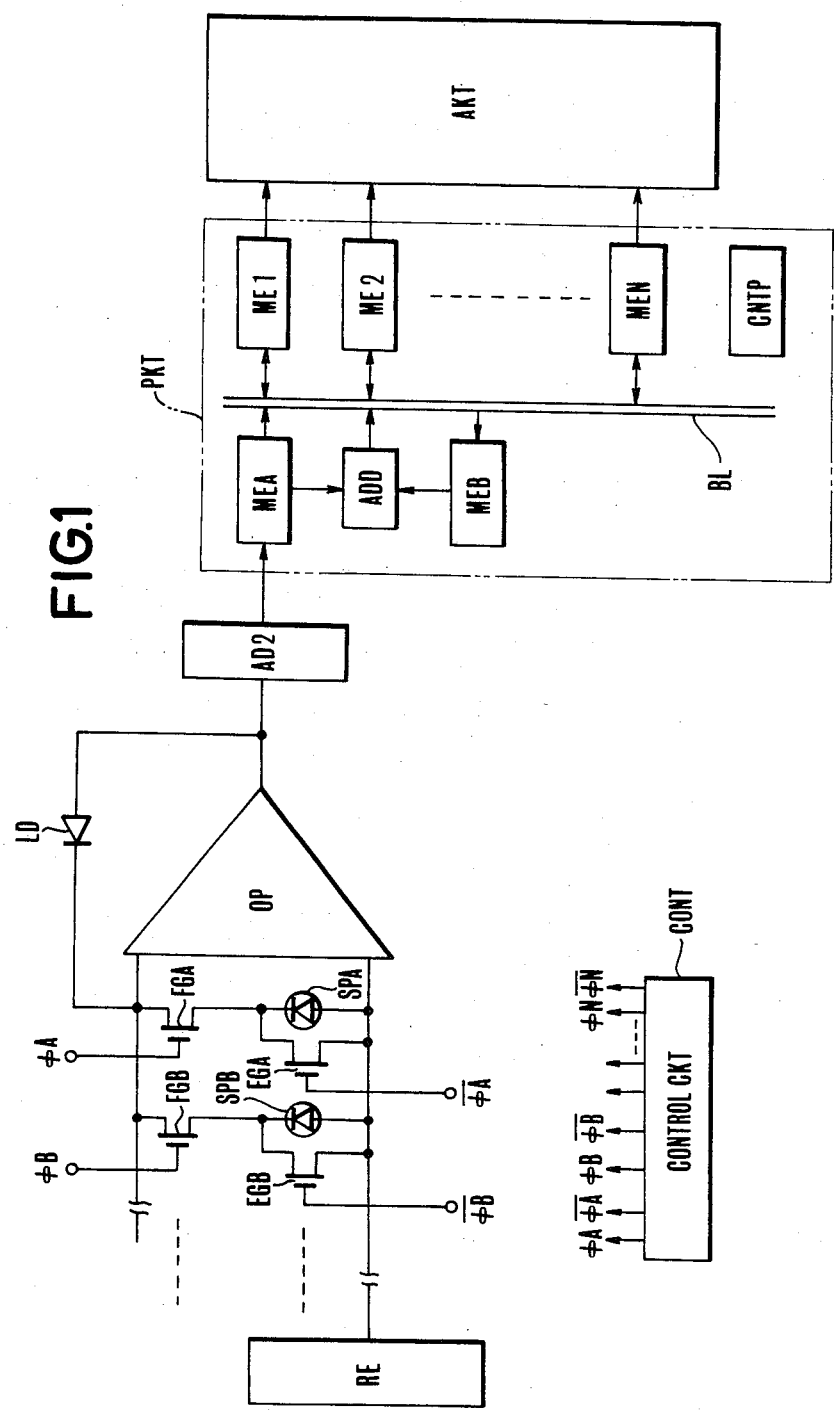
FIG. 1 is a circuit diagram of an embodiment of a light measuring apparatus for a single lens reflex camera to which the present invention is applied.
Figure 4:
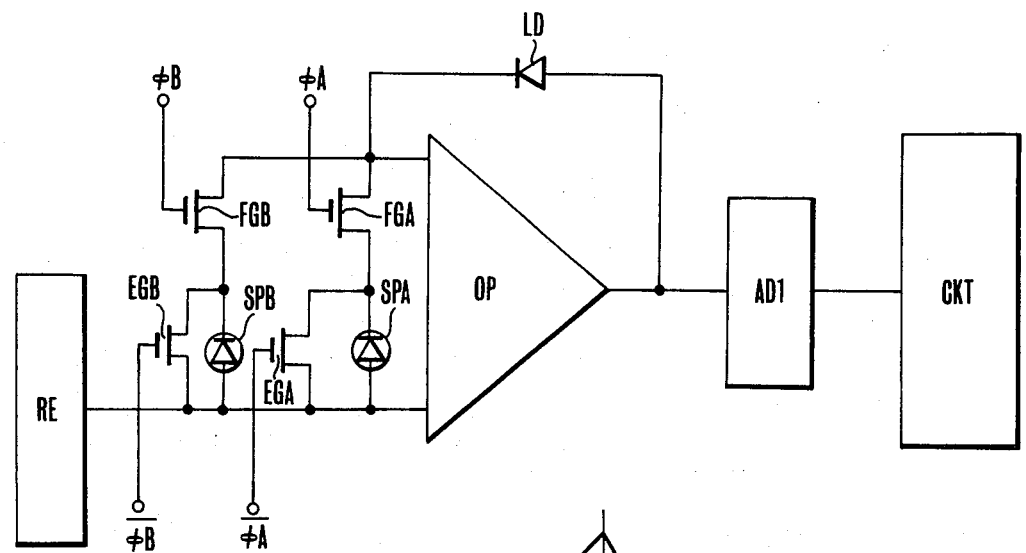
FIG. 4 is a circuit diagram of a conventional light measuring apparatus.
Figure 5:
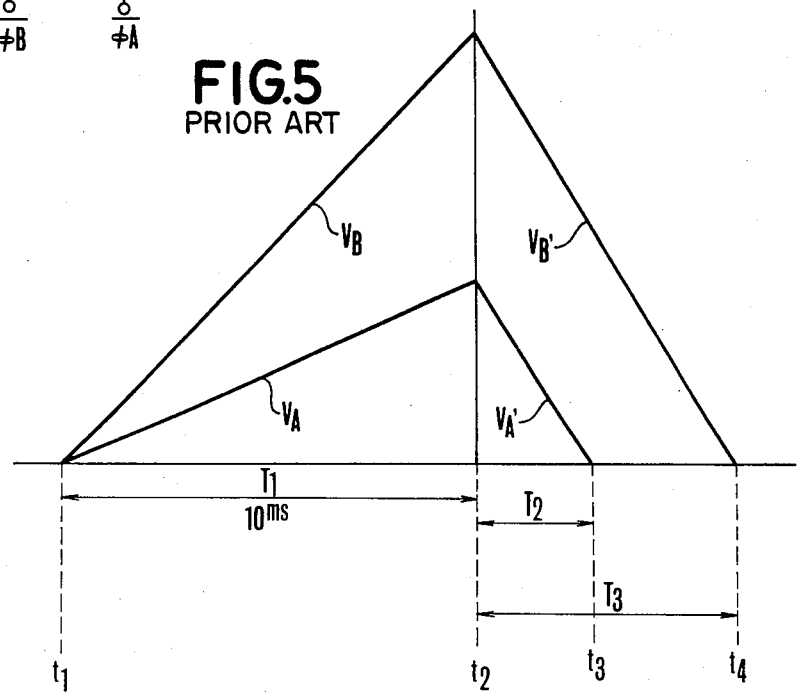
FIG. 5 is a diagram for explaining an operation of an AD conversion circuit used in the apparatus shown in FIG. 4.

FIG. 1 shows a first embodiment of a light measuring apparatus of a single lens reflex camera to which the present invention is applied. In this diagram, parts indicated by same identification marks as those in FIG. 4 show same elements which constitute a conventional light measuring apparatus.

In a light measuring apparatus shown in FIG. 1, an AD converter AD2 connected to an output terminal of an operational amplifier OP is not a conventional AD converter of a double integration type but is an AD converter of a known type of successive comparison type or a parallel comparison type and can make an AD conversion at by far faster speed than that of an AD converter of a double integration type (for example in 10 $\mu$s).

AKT is an operation circuit for making a light measuring operation of an output from a plurality of light measuring elements, provided in correspondence to each measuring portion for the purpose of measuring an illuminance of each measuring portion of a scene. A pre-computing device PKT for operating a mean value or an added value of outputs of each light measuring element SPA and SPB within a prescribed cycle is provided between the AD converter AD2 and the operational circuit AKT. This pre-computing device PKT can be formed on a semiconductor substrate which is common to the AD converter AD2 and the operational circuit AKT. This computing device PKT consists of memories for operation MEA and MEB, an adder ADD, memories ME1 to MEN for memorizing operated values and outputs of the light measuring elements provided for each one of the light measuring elements, a bus line BL for sending an address signal to each one of the memories mentioned, and a control circuit CNTP for controlling a sequence of the computing device PKT including an operating sequence, etc.

Figure 2:
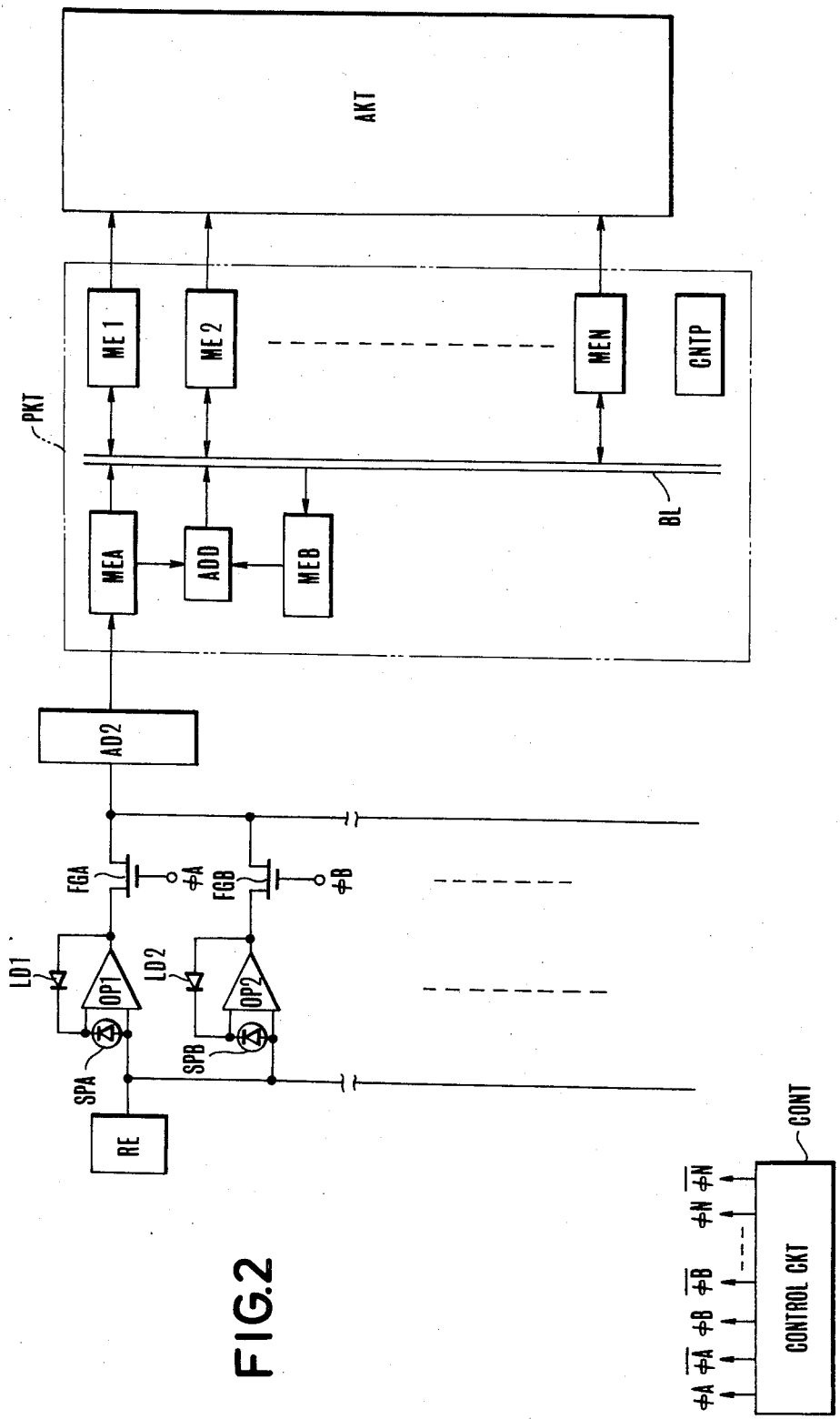
FIG. 2 is an electrical circuit diagram of a light measuring apparatus of a single lens reflex camera according to a second embodiment of the present invention.

FIG. 2 shows another example of arrangement of an apparatus different from that shown in FIG. 1, wherein same identification marks as those in FIG. 1 represent same component parts.

In the embodiment shown in FIG. 2, operational amplifiers OP1, OP2 . . . , logarithmic compression elements LD1, LD2, . . . , and analog switches FGA, FGB . . . are provided at every one of light measuring elements SPA, SPB . . . , and at the same time analog switches FGA, FGB, . . . are connected to output terminal sides of the operational amplifiers OP1, OP2. . . . Therefore, since a change-over of the light measuring elements is not made at the input side of the operational amplifiers, good response characteristics are obtained even if an output level of the light measuring elements is low (that is even if the brightness of an object is low), thus a light measuring with higher degree of accuracy than that in the light measuring circuit of FIG. 1 can be made.

Next, explanations shall be made on operations of the light measuring apparatus of FIGS. 1 and 2 by referring to FIGS. 1 to 3B.

Figure 3A:
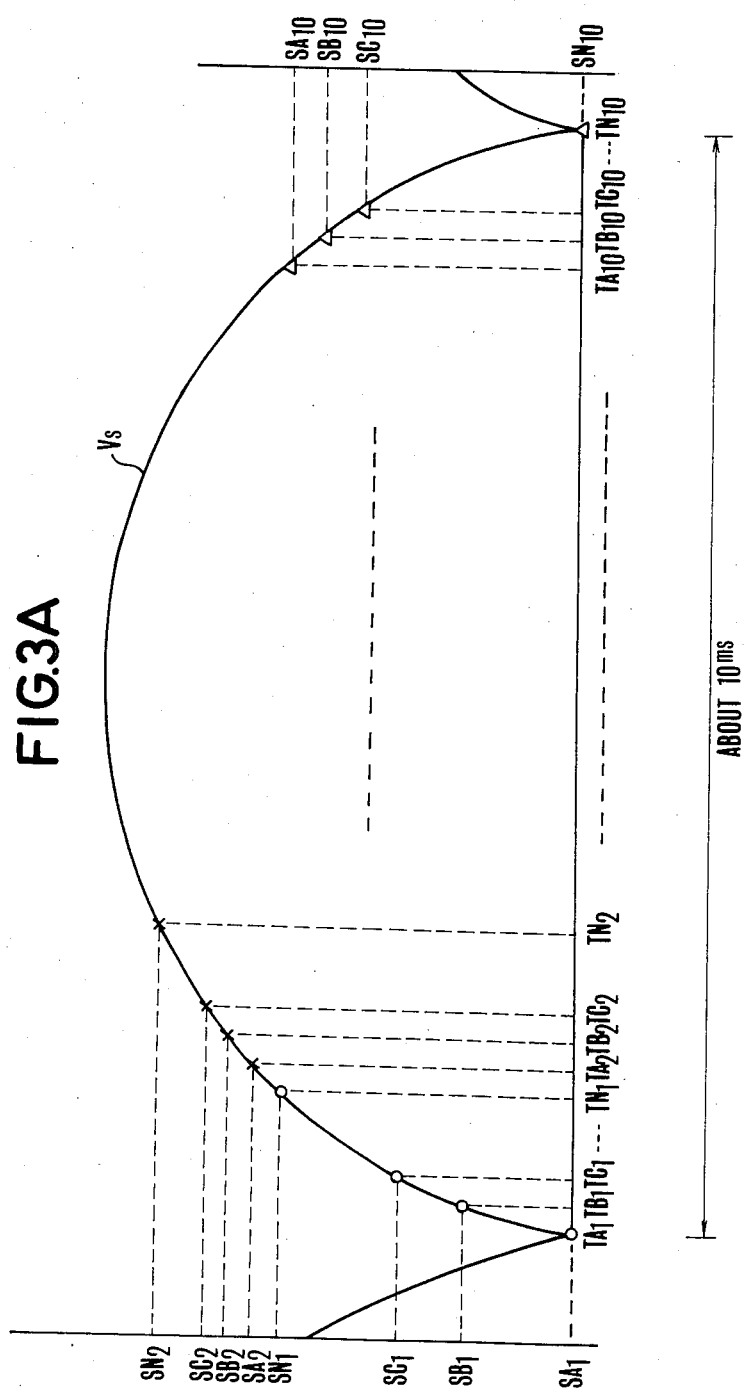
FIG. 3A is a diagram depicting schematically a flicker waveform for explaining an operation in the present invention.

In FIG. 3A, $V_S$ indicates a variation in one flicker cycle (about 10 m.sec.) of the luminous intensity of a light source (for example a incandescent lamp) being driven by a power source with commercial frequency, wherein the axis of abscissas represents a length of time and the axis of ordinates shows the luminous intensity. Now, circuit, operations shall be explained for the case wherein the light measuring of a place or an object being illuminated by such light source is made by light measuring apparatus of FIG. 1 and of FIG. 2.

When such control pulse $\phi A$ as shown by FIG. 3B is produced from the control circuit CONT and the analog switch FGA is turned on at a time $TA_1$, the light beam with a luminous intensity of $SA_1$ impinges into the light measuring element SPA and an output is produced at the light measuring element SPA (at this time the analog gate EGA at the apparatus of FIG. 1 is turned off), and this output is (here this output contains as a matter of course both elements of signal elements and flicker elements at the measuring portions at which the light measuring is done by the light measuring element SPA) amplified by the operational amplifier OP (or OP1) and at the same time becomes a signal being logarithmically compressed by the logarithmic compression element LD (or LD1) and is impressed onto the AD converter AD2. And the signals converted by the AD converter AD2 to digital signals are memorized in a memory ME1 through a memory MEA in a pre-computing device PKT.

Next, at a time $TB_1$ the analog switch FGB is turned on as such control pulse $\phi B$ as shown in FIG. 3A is produced by the control circuit CONT, and such output as corresponding to the luminous intensity SB₁ is generated at the light measuring element SPB, then this output is amplified by the operational amplifier OP (or OP2) and at the same time is impressed onto the AD converter AD2 as a signal which has been logarithmically compressed by the logarithmic compression element LD (or LD2), and, after becoming a digital signal in the AD converter AD2, is memorized in a memory ME2 through the memory MEA. In the embodiment shown in FIG. 2, each one of the light measuring elements SPC, SPD (not shown) . . . SPN respectively produces such output as corresponding to the luminous intensity $SC_1, \ldots SN_1$, at a time $TC_1, \ldots TN_1$ in a similar manner, and such output signals are, after being AD converted, memorized in a memory ME3 (not shown) . . . MEN corresponding to each light measuring element, through the memory MEA.

And after a first sampling of an output of each light measuring element is completed as has been mentioned above, a second sampling is started from a time $TA_2$ in response to the outputs $\phi A \ldots \phi N$ of the control circuit CONT. That is, when the analog switch FGA is turned on by the output $\phi A$ of the control circuit CONT at the time $TA_2$, an output of the light measuring element SPA corresponding to the luminous intensity $SA_2$ at that time is impressed onto the AD converter AD2 through the operational amplifier OP (or OP1) in a similar manner as above, then after being converted to a digital signal in the AD converter AD2, is memorized in the memory MEA. At the same time with this, the output data of the preceding sampling which have been stored in the memory ME1 are transferred to the memory MEB through the bus line BL, then the sampling data of this time at the memory MEA and the preceding sampling data are added in the adder ADD. And thus added data are stored again in the memory ME1 through the bus line BL.

Then, an output of the light measuring element SPB sampled at the time $TB_2$ (corresponding to the luminous intensity $SB_2$) is, after being AD (analog-digital) converted, added together with the sampling data of the preceding sampling which has been stored in the memory ME2, and such added data are stored again in the memory ME2. Thereafter, in a similar manner, an output of the light measuring element SPN sampled at the time $TN_2$ (with the luminous intensity $SN_2$) is, after being AD converted, added together with the preceding sampling data stored in the memory MEN, and is stored in the memory MEN.

When a prescribed number of samplings are made during a period of one cycle of flickering of the light source as mentioned above (while ten samplings are made in this embodiment as shown in FIG. 3A, the number of the samplings may be determined corresponding to an accuracy in the light measuring needed), the total sum of the data of a prescribed number of samplings will be memorized in each one of the memories ME1 to MEN. Since these sampling data (that is light measuring data) are what have been sampled within a time period of one cycle of flickering of the light source, they constitute light measuring values not influenced by flickering. That is, if a signal element at each measuring portion (illuminance at each measuring portion from which the flickering elements are eliminated) is the same, a level of an output of each light measuring element accumulated during the period of time TA to TN will be the same, thus light measuring data substantially not influenced by flickering can be obtained.

The light measuring data sampled within one cycle of the flickering of a light source are thus taken out from the memories ME1 to MEN and are sent to a next operating circuit AKT, then are used in an operation for computing an exposure value at the operating circuit AKT. In the present invention, the light measuring data used in the light measuring computation are accumulated values of the light measuring data sampled for a number of times within one cycle of flickerings of the light source as mentioned above, but instead of the accumulated values a mean value (which may be any mean value out of weighted average value, an arithmetical mean value) may be supplied to the operating circuit as the light measuring output. Such light measuring data as mentioned above are data of an accumulated value or mean value of the light measuring data which have been sampled for a number of times, therefore they do not contain an influence of flickering, thus a light measuring computation in which an influence of flickering is eliminated can be made. Also, in the present invention, such AD conversion of a double integration type as in a conventional method is not employed when an output of a light measuring element is AD converted, instead an AD conversion of a successive comparison type or a parallel comparison type is made, therefore, the AD conversion can be made at by far faster speed than that in a conventional method, and as a result, a light measuring in the present invention can be made at a higher speed and a shorter period of time than those in a conventional method. Particularly, the larger the number of light measuring elements built in a light measuring apparatus in the present invention is, the faster and more accurately the light measuring can be made compared to a conventional method.

According to the above-mentioned light measuring method, an accurate light measuring can be made against a light source which flickers cyclicly in a sine wave form within one computing cycle, but when the luminous intensity of a light source increases in a mono tone or when the same decreases in a mono tone, an error will take place. Embodiments shown in FIG. 6 on are to eliminate such drawbacks, and a light measuring apparatus, which can eliminate completely an influence of flickering of a light source even when the luminous intensity of a light source increases in a mono tone, etc., and at the same time can make an accurate light measuring, is provided.

Figure 6:
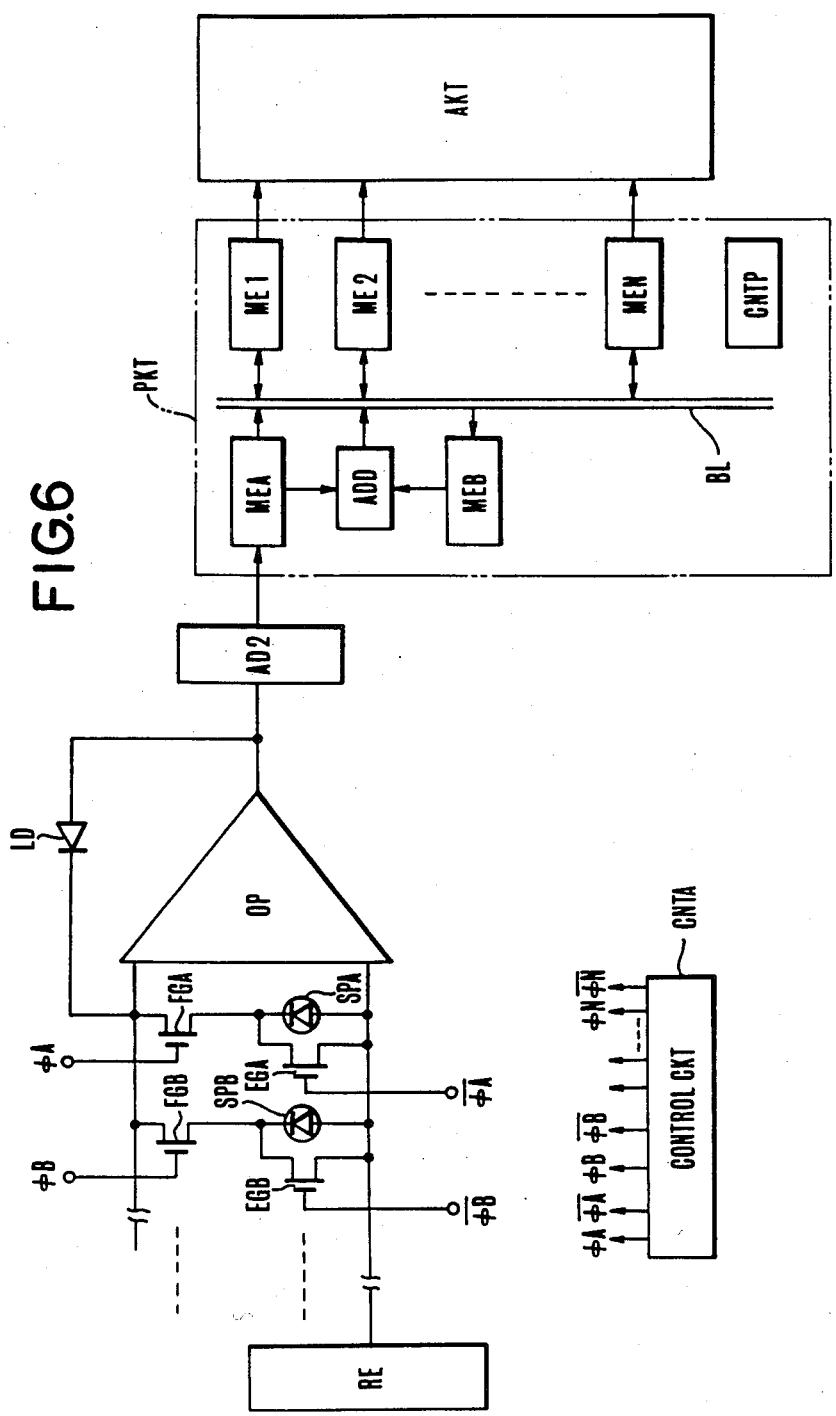
FIGS. 6 and 7 are circuit diagrams for light measuring apparatus of single lens reflex cameras according to third and fourth embodiments of the present invention.

In FIG. 6, which shows a light measuring apparatus for a single lens reflex camera, parts shown with same identification marks as those in FIG. 1 indicate same elements constituting the embodiment shown in FIG. 1.

In a light measuring apparatus shown in FIG. 6, the AD converter AD2 connected to the output terminal of the operational amplifier OP is not an AD converter of a conventional double integration type, but is a high speed AD (analog-digital) converter of a successive comparison type or a parallel comparison type, which can make an AD (analog-digital) conversion at by far faster speed than that of a double integration type (for example at about 10 μs). AKT is an operating circuit for making a computation to obtain an exposure value, and a pre-computing device PKT, for computing a mean value or an added value of outputs of each one of the light measuring elements SPA and SPB within a prescribed cycle, is provided between the AD converter AD2 and the operating circuit AKT. This pre-computing device PKT may be formed in a monolithic manner on a common semiconductor chip with the AD converter AD2 and the operating circuit AKT. This computing device PKT consists of memories MEA and MEB for computing, an adder ADD, memories ME1 to MEN for memorizing computing values and outputs of light measuring elements provided at each light measuring element, a bus line BL for sending an address signal to each one of the above-mentioned memories and a control circuit CNTP for controlling a sequence of the computing device PKT including a computing sequence.

Figure 7:
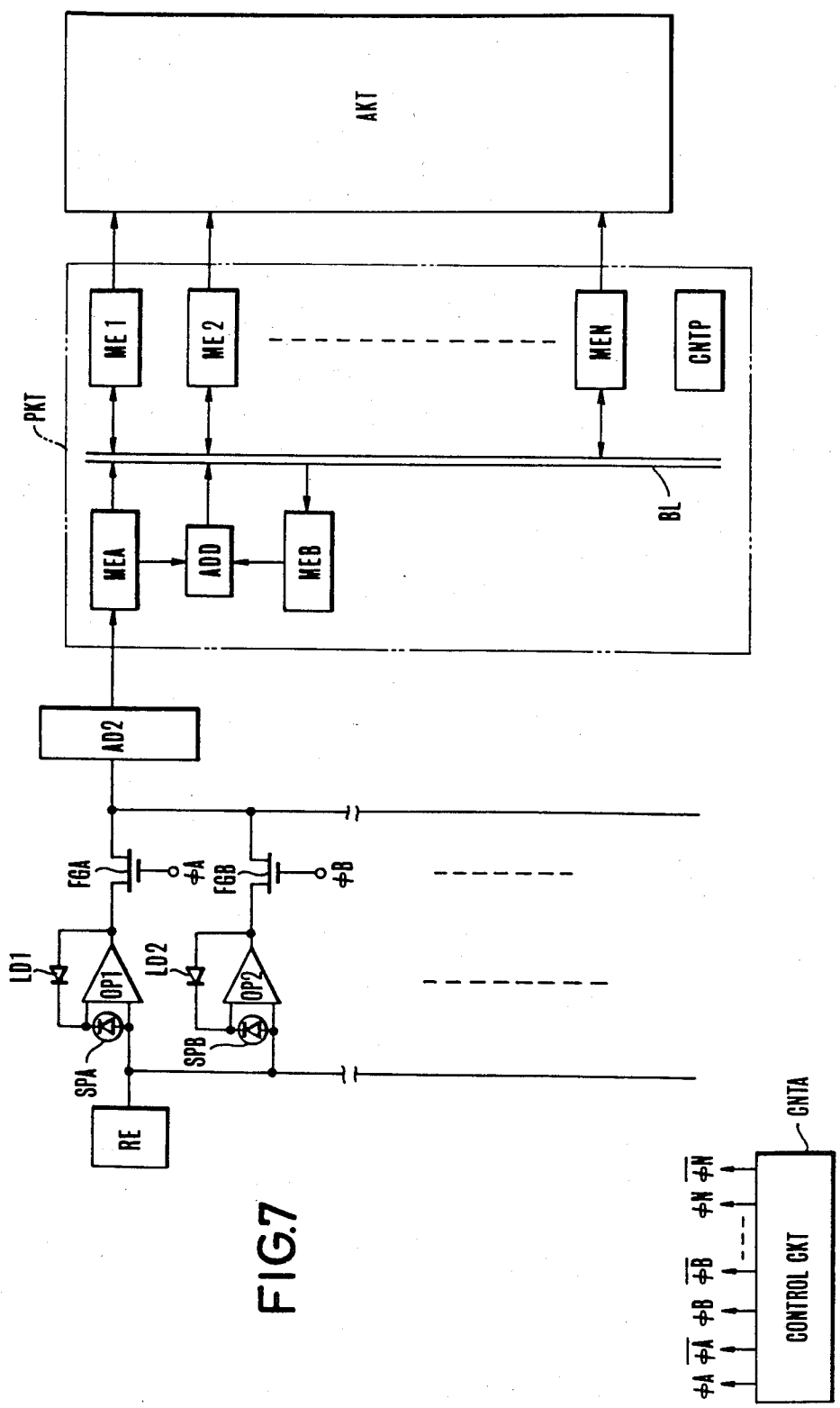

FIG. 7 shows another example of an arrangement of an apparatus which is different from an apparatus shown in FIG. 6, and same identification marks in FIG. 7 as those shown in FIG. 6 indicate same components shown in FIG. 6.

In an embodiment shown in FIG. 7, operational amplifiers OP1, OP2, . . . and logarithmic compression elements LD1, LD2, . . . as well as analog switches FGA, FGB, . . . are provided at each one of the light measuring elements SPA, SPB, . . ., and at the same time the analog switches FGA, FGB, . . . are connected to output terminal sides of the operational amplifiers OP1, OP2, . . .

Therefore, since there is no change-over of light measuring elements at an input side of the operational amplifier, even if an output level of the light measuring element is low (that is even if the brightness of an object is low), its response characteristic is good, therefore a light measuring with a higher level of accuracy than that in the light measuring apparatus shown in FIG. 6 can be made.

FIG. 8 shows an illumination state of a variation in the luminous intensity wherein the present invention becomes particularly effective.

In FIG. 8, what is shown as $V_S$ shows a variation in one flickering cycle (about 10 m.sec.) of the luminous intensity of a light source driven by an alternating current power source of sawtooth shape waves with 50 Hz or 60 Hz, wherein the axis of abscissas shows time and the axis of ordinates shows a luminous intensity. Now, operations when a light measuring of a place or an object being illuminated by such light source is made by the present invention with light measuring apparatus shown in FIGS. 6 and 7, will be explained below.

When such control pulse $\phi A$ as shown in FIG. 8 is produced from a control circuit CNTA and an analog switch FGA is turned on at a time $TA_1$, the light beam of the luminous intensity $SA_1$ impinges into a light measuring element SPA and an output is produced at the SPA (at this time the analog circuit EGA in the circuit of FIG. 6 is turned off), then this output is amplified by an operational amplifier OP (or OP1) and at the same time becomes a signal which is logarithmically compressed by a logarithmic compression element LD (or LD1) then is impressed onto an AD converter AD2. And a signal converted to a digital signal by the AD converter AD2 is memorized by a memory ME1 through a memory MEA of a pre-computing device.

Next, as such control pulse $\phi B$ as shown in FIG. 8 is produced from the control circuit CNTA at a time $TB_1$, the analog switch FGA is turned on, and an output corresponding to the luminous intensity $SB_1$ is produced at the light measuring element SPB, then this output is amplified by the operational amplifier OP (or OP2) and at the same time becomes a signal logarithmically compressed by the logarithmic compression element LD (or LD2) then is impressed onto the AD converter AD2, and, after becoming a digital signal by the AD converter AD2, is memorized by a memory ME2 through the memory MEA. In the embodiment shown in FIG. 7, in a similar manner as mentioned above, each one of the light measuring elements SPC, SPD (not shown) . . . SPN produces such output as corresponding to the luminous intensity $SC_1, \ldots SN_1$ repectively at the time $TC_1 \ldots TN_2$, and these output signals are, after AD converted, memorized in a memory ME3 (not shown) . . . MEN corresponding to each light measuring element through the memory MEA, in turn in a same manner as mentioned above.

After a first sampling of an output of each light measuring element is completed as mentioned above, a second sampling is started at the time $TN_2$ in correspondence to outputs, $\phi A$ to $\phi N$, of the control circuit CNTA. That is, when the analog switch FGN (not shown) is turned on at the time $TN_2$ by an output $\phi N$ of the control circuit CNTA, an output of such light measuring element SPN (not shown) as corresponding to the luminous intensity $SN_2$ at that time is impressed onto the AD converter AD2 through the operational amplifier OP (or OPN) in a similar manner as mentioned above, and is, after being converted to a digital signal by the AD converter AD2, memorized in the memory MEA. At the same time, after the output data of the preceding sampling which have been housed in the memory MEN are transferred to the memory MEB through the bus line BL, the sampling data of this time at the memory MEA and the preceding sampling data at the memory MEB are added together by the adder ADD. And thus added data are stored in the memory MEN again through the bus line BL. Then, in a similar manner, a second sampling of the light measuring data are done in an order of the time $TC_2, TB_2, TA_2$, from the light measuring element SPN towards the light measuring element SP being reverse to the sequence in the first sampling, then the second sampling data are added to the first sampling data and are stored in each one of the memories ME1 to MEN for each light measuring element as mentioned above.

Such sampling process is repeated for a required number of times (while it is 10 times in this embodiment, the number of sampling may be suitably set depending on a light measuring accuracy needed), thus a light measuring within one cycle of flickering of the light source will be completed.

Accumulated light measuring data within one flickering cycle for each light measuring element thus obtained are read out from each one of the memories ME1 to MEN and are introduced into the operating circuit AKT, where a light measuring computation will be made. While the light measuring data used in the light measuring computation in the present invention are accumulated values of the light measuring data sampled for a number of times within one cycle of flickering of the light source as mentioned above, a mean value instead of the accumulated values (any mean value such as a weighted average, an arithmetic average, etc. may be used) may be used for the light measuring computation. Since such light measuring data as mentioned above are data within one cycle of flickering they do not contain an influence of the flickering, therefore a light measuring computation in which an influence of flickering is completely eliminated can be made according to the method of the present invention.

While the method in this embodiment may be applied to a light measuring of an illumination with such luminous intensity variation as varying symmetically within one cycle of flickering (for example in a sine wave form), it is particularly suited for a light measuring of an illumination with such luminous intensity variation as increasing in a mono tone (or decreasing in a mono tone) within one cycle of flickering as shown in FIG. 8, thus a light measuring of an illumination which varies along an elapse of time can be made accurately.

Also, when the output of the light measuring element is AD converted in this embodiment, an AD conversion of a double integration type as in a conventional method is not made, instead an AD conversion of a successive comparison or a parallel comparison type is made, therefore an AD conversion can be made in a by far faster speed than that in a conventional method, and as a result a light measuring in the present invention can be made with a higher speed and a shorter period of time than those in a conventional method. Particularly the larger the number of light measuring elements built in a light measuring circuit (each one of such light measuring elements makes a light measuring of light beam from each light measuring portion of a light measuring scene like in the first embodiment and produces such electric signal as corresponding to the intensity of the incident light), the more faster and in shorter period of time an accurate light measuring can be made than those in a conventional method.

As has been explained above, according to the present invention, a light measuring can be made in a faster and more accurate manner than in a conventional method even under an illumination in which the luminous intensity increases and decreases or increases in a mono tone within one flickering cycle for example as shown in FIGS. 3 and 8, and as a result, an exposure control with a high level of accuracy can be made against various objects under various lighting conditions by providing an electronic shutter to which the present invention is applied in a camera.

What is claimed is:

1. A light measuring apparatus, comprising:
   (a) a plurality of light sensitive elements for producing an electrical signal corresponding to the intensity of incident light from each one of light measuring portions to which said elements correspond respectively;
   (b) a plurality of memory means provided in correspondence to each light sensitive element for memorizing each one of said electrical signals from each light sensitive element; and
   (c) control means operatively connected to said memory means for supplying a plurality of times an electrical signal corresponding to the electrical signal from each light sensitive element to each memory means corresponding to each light sensitive element in a prescribed order, thereby each memory means producing a light measuring result.

2. A light measuring apparatus according to claim 1, wherein said control means reverses the order of supply of the electrical signal to memory means after a round of the supply to each memory means is completed.

3. A light measuring apparatus according to claim 1, further comprising a plurality of switching elements for placing each one of said light sensitive elements in an operative state in a time series in response to a control signal from said control means.

4. A light measuring apparatus according to claim 3, wherein each of the switching elements includes a field effect transistor.

5. A light measuring apparatus for a camera, comprising:
   (a) a plurality of light sensitive elements for producing an electrical signal corresponding to the intensity of incident light from each one of light measuring portions to which said elements correspond respectively;
   (b) amplifier means for amplifying the electrical signal;
   (c) a plurality of memory means connected to said amplifier means for memorizing each one of the amplified electrical signals from said amplifier means; and
   (d) control means operatively connected to said memory means for supplying a plurality of times an electrical signal corresponding to the electrical signal from each light sensitive element to each memory means corresponding to each light sensitive element in a prescribed order, thereby each memory means producing a light measuring result.

6. A light measuring apparatus, comprising:
   (a) a plurality of light sensitive elements for producing an electrical signal corresponding to the intensity of incident light from each one of light measuring portions to which said elements correspond respectively;
   (b) analog-to-digital conversion means operatively connected to said light sensitive elements for converting each one of said electrical signals from each light sensitive element to a digital signal;
   (c) a plurality of memory means provided in correspondence to each light sensitive element for memorizing each one of said digitalized electrical signals; and
   (d) control means operatively connected to said memory means for supplying for a plurality of times the digitalized electrical signals corresponding to the electrical signal from each light sensitive element to each memory means corresponding to each light sensitive element in a prescribed order, thereby producing a light measuring result from each memory means.

7. A light measuring apparatus according to claim 6, wherein said control means reverses the order of supplying the electrical signal to memory means after a round of the supply to each memory means is completed.

8. A light measuring apparatus according to claim 6, further comprising a plurality of switching elements for placing each one of said light sensitive elements in an operative state in a time series in response to a control signal from said control means.

9. A light measuring apparatus for measuring light produced by an artificial light source having a given flicker cycle, comprising:
   (a) light sensitive means for producing an analog electrical signal corresponding to the intensity of incident light from a portion for which a light measuring is to be made;
   (b) analog to digital conversion means functionally connected to said light sensitive means for converting the electrical signal from said light sensitive means to a digital signal;

(c) integrating means connected to said conversion means for integrating the digital signal from said conversion means; and (d) control means operatively connected to said integrating means for supplying for a plurality of times within said flicker cycle said digital signal correponding to the analog electrical signal from the light sensitive means to the integrating means, thereby producing a light measuring result from said integrating means which is substantially free of light source flickering effect.

10. A light measuring apparatus according to claim 9, wherein said integrating means includes a plurality of memory elements.

* * * * *